US012319548B2

(12) United States Patent
Sun et al.

(10) Patent No.: US 12,319,548 B2
(45) Date of Patent: Jun. 3, 2025

(54) BOOM EXTENSION DEVICE FOR DOCKSIDE CONTAINER CRANE, AND EXTENSION METHOD FOR SAME

(71) Applicant: Shanghai Zhenhua Heavy Industries Co. Ltd, Shanghai (CN)

(72) Inventors: Xianhai Sun, Shanghai (CN); Min Zhu, Shanghai (CN); Hongya Su, Shanghai (CN); Zhiwen Feng, Shanghai (CN); Cong Jia, Shanghai (CN)

(73) Assignee: Shanghai Zhenhua Heavy Industries Co. Ltd, Shanghai (CN)

( * ) Notice: Subject to any disclaimer, the term of this patent is extended or adjusted under 35 U.S.C. 154(b) by 608 days.

(21) Appl. No.: 17/638,314

(22) PCT Filed: Aug. 28, 2019

(86) PCT No.: PCT/CN2019/103012
§ 371 (c)(1),
(2) Date: Feb. 25, 2022

(87) PCT Pub. No.: WO2021/035570
PCT Pub. Date: Mar. 4, 2021

(65) Prior Publication Data

US 2022/0306429 A1 Sep. 29, 2022

(30) Foreign Application Priority Data

Aug. 26, 2019 (CN) ......................... 201910788151.0

(51) Int. Cl.
*B66C 6/00* (2006.01)
*B66C 19/00* (2006.01)

(52) U.S. Cl.
CPC .............. *B66C 6/00* (2013.01); *B66C 19/002* (2013.01)

(58) Field of Classification Search
CPC .. B66C 7/10; B66C 6/00; B66C 17/00; B66C 17/26; B66C 19/00; B66C 19/002
See application file for complete search history.

(56) References Cited

U.S. PATENT DOCUMENTS

2009/0134646 A1* 5/2009 Tavio Diaz ........... B66C 19/002 414/800
2010/0104407 A1* 4/2010 Pulliam ................. B66C 19/002 198/618

FOREIGN PATENT DOCUMENTS

CN 103145047 A * 6/2013
SE 418278 B * 5/1981 ............. B66C 17/00

* cited by examiner

*Primary Examiner* — Sang K Kim
*Assistant Examiner* — Nathaniel L Adams
(74) *Attorney, Agent, or Firm* — Chambliss, Bahner & Stophel, P.C.; Stephen D. Adams

(57) ABSTRACT

A boom extension device for a dockside container crane. A boom comprises a rear boom section (11) and a front boom section (12). The extension device comprises: an extension trolley tool (2) which is disposed below the rear boom section (11) and the front boom section (12) during an extension operation, and which comprises a wheel set (21), a trolley frame (22), a construction platform (23), and a movement track (24) disposed on the construction platform; a fits support frame trolley (31) disposed on the movement track (24) and used to carry a boom extension section (41) and guide the boom extension section (41) to move in a first direction; and a second support frame trolley (32) disposed on the movement track (24) and used to carry the front boom section (12) and guide the front boom section (12) to move in a second direction perpendicular to the first direction in a first plane. Further included is an extension method for a boom of a dockside container crane. The invention reduces usage of heavy-duty equipment.

23 Claims, 4 Drawing Sheets

BOOM EXTENSION DEVICE FOR DOCKSIDE CONTAINER CRANE, AND EXTENSION METHOD FOR SAME

TECHNICAL FIELD

The present invention relates to a boom of a crane, and in particular to a boom extension device for a dockside container crane, and an extension method for same.

BACKGROUND

With the enlargement of container transport ships, the forward extension distance of existing quay cranes of many wharves can no longer meet the loading and unloading requirements. At present, the commonly used boom extension solutions mainly include: 1. the front boom is put to the ground by a floating crane for extension; and 2. the quay crane is pulled to the back, and the front boom is put downwards by large lifting equipment (truck crane or crawler crane) and is reset after extension. The two solutions have high requirements on the lifting equipment and sites, and have long construction period and high cost.

SUMMARY

The problem to be solved by the present invention is how to reduce the use of large equipment. The present invention provides a boom extension device for a dockside container crane, and an extension method for same, thereby reducing the use of large equipment.

To solve the above problem, embodiments of the present invention disclose a boom extension device for a dockside container crane. A boom includes a rear boom section and a front boom section. The extension device includes: an extension trolley tool, used to be arranged below the rear boom section and the front boom section during extension operation and including a wheel set, a trolley frame, a construction platform, and a movement track arranged on the construction platform; a first support frame trolley, arranged on the movement track and used to carry a boom extension section and guide the boom extension section to move in a first direction; and a second support frame trolley, arranged on the movement track and used to carry the front boom section and guide the front boom section to move in a second direction perpendicular to the first direction in a first plane.

By adoption of the above technical solution, a quay crane does not need to move, and the use of large equipment is reduced.

According to another specific embodiment of the present invention, the embodiment of the present invention discloses a boom extension device for a dockside container crane, including: a process support, mounted on two sides of a cutting line.

By adoption of the above technical solution, boom bodies at two ends can be prevented from shrinkage or expansion deformation after the boom is cut.

According to another specific embodiment of the present invention, the embodiment of the present invention discloses a boom extension device for a dockside container crane, wherein a process support includes a first process support and a second process support, two ends of the first process support are connected to two inner side walls of the rear boom section, and two ends of the second process support are connected to two inner side walls of the front boom section.

By adoption of the above technical solution, the boom is cut into the front boom section and the rear boom section along the cutting line, the two ends of the first process support are connected to the two inner side walls of the rear boom section, and the two ends of the second process support are connected to the two inner side walls of the front boom section, so that the front boom section and the rear boom section can be prevented from shrinkage or expansion deformation.

According to another specific embodiment of the present invention, the embodiment of the present invention discloses a boom extension device for a dockside container crane, wherein a boom extension section is arranged below the second process support.

By adoption of the above technical solution, after the front boom section provided with the second process support moves in place, the boom extension section may directly move in a first direction to be aligned with the rear boom section, thereby preventing the boom extension section from being singly lifted from the ground to high altitude, and reducing the use of large equipment.

According to another specific embodiment of the present invention, the embodiment of the present invention discloses a boom extension device for a dockside container crane, further including: jacks, arranged below the front boom section and the boom extension section.

By adoption of the above technical solution, the jacks arranged below the front boom section and the boom extension section may adjust the heights of the front boom section and the boom extension section.

According to another specific embodiment of the present invention, an embodiment of the present invention discloses a boom extension device for a dockside container crane, wherein the extension trolley tool further includes: detachable casing handrails, arranged on casings around the trolley frame.

By adoption of the above technical solution, the detachable casing handrails are provided, thereby facilitating disassembly, assembly and transportation, and further ensuring the safety of workers in the operation process.

According to another specific embodiment of the present invention, the embodiment of the present invention discloses a boom extension device for a dockside container crane, wherein a distance between the first process support or/and the second process support and the cutting line is 800 mm.

By adoption of the above technical solution, selecting the arrangement position of the first process support or/and the second process support can effectively prevent the front boom section and the rear boom section from shrinkage or expansion deformation.

According to another specific embodiment of the present invention, the embodiment of the present invention discloses a boom extension device for a dockside container crane, wherein the process support is a round pipe.

By adoption of the above technical solution, the round pipe has high rigidity and strength, and the round pipe, as the process support, can effectively prevent the front boom section and the rear boom section from shrinkage or expansion deformation.

According to another specific embodiment of the present invention, the embodiment of the present invention discloses a boom extension device for a dockside container crane, further including a stop plate, arranged on a head part of the extension trolley tool.

By adoption of the above technical solution, the second support frame trolley can be effectively prevented from separation when carrying the front boom section and guiding the front boom section to move in a second direction perpendicular to the first direction in a first plane to a limiting position, thereby avoiding potential safety hazards.

According to another specific embodiment of the present invention, the embodiment of the present invention disclose a boom extension device for a dockside container crane, further including crossties, arranged on the first support frame trolley and the second support frame trolley.

By adoption of the above technical solution, the crossties and the jacks are used to adjust the height of the boom extension section.

According to another specific embodiment of the present invention, the embodiment of the present invention discloses a boom extension device for a dockside container crane, further including: pull lugs and steel wire ropes, which are arranged in the second direction and are used to move the front boom section.

By adoption of the above technical solution, the front boom section is moved in the second direction through chain blocks and the pull lugs.

An embodiment of the present invention further discloses an extension method for a boom of a dockside container crane, including: arranging an extension trolley tool below a boom; cutting the boom along a cutting line to form a rear boom section and a front boom section; moving the front boom section in place in a second direction and fixing the front boom section; moving a boom extension section to be between the rear boom section and the front boom section and performing mutual alignment; and connecting the boom extension section to the rear boom section and the front boom section.

By adoption of the above technical solution, the use of large equipment can be reduced.

According to another specific embodiment of the present invention, the embodiment of the present invention discloses an extension method for a boom of a dockside container crane. Before the step of arranging the extension trolley tool below the boom, the method includes: assembling a trolley frame of the extension trolley tool on the ground, and mounting a construction platform.

By adoption of the above technical solution, the trolley frame of the extension trolley tool is assembled on the ground and the construction platform is mounted, so that the aloft workload is reduced.

According to another specific embodiment of the present invention, the embodiment of the present invention discloses an extension method for a boom of a dockside container crane. After the step of assembling the trolley frame of the extension trolley tool on the ground and mounting the construction platform, the method includes: lifting the trolley frame, and performing aerial docking on the trolley frame and a wheel set lifted on the boom to complete assembly of the extension trolley tool, wherein the extension trolley tool includes the wheel set, the trolley frame, the construction platform, and a movement track arranged on the construction platform.

By adoption of the above technical solution, flanges of upper and lower structures are adjusted by the chain blocks until bolts are assembled completely, thereby completing the assembly of the extension trolley tool.

According to another specific embodiment of the present invention, the embodiment of the present invention discloses an extension method for a boom of a dockside container crane. Before the step of cutting the boom along the cutting line to form the rear boom section and the front boom section, the method includes: arranging a process support on two sides of the cutting line in a first direction.

By adoption of the above technical solution, boom bodies at two ends can be prevented from shrinkage or expansion deformation after the boom is cut.

According to another specific embodiment of the present invention, the embodiment of the present invention discloses an extension method for a boom of a dockside container crane. The step of moving the front boom section in place in the second direction and fixing the front boom section includes: arranging pull lugs and steel wire ropes in the second direction for moving the front boom section arranged on a second support frame trolley.

By adoption of the above technical solution, the front boom section is moved in the second direction through chain blocks and the pull lugs.

According to another specific embodiment of the present invention, the embodiment of the present invention discloses an extension method for a boom of a dockside container crane. The step of moving the front boom section in place in the second direction and fixing the front boom section includes: locking the chain blocks and wheels of the second support frame trolley after the front boom section is in place.

By adoption of the above technical solution, the potential safety hazard caused by sliding of the front boom section can be avoided.

According to another specific embodiment of the present invention, the embodiment of the present invention discloses an extension method for a boom of a dockside container crane. The step of moving the front boom section in place in the second direction and fixing the front boom section includes: arranging a stop plate on a head part of the extension trolley tool so as to prevent the second support frame trolley from separation after arriving at a limiting position.

By adoption of the technical solution, the second support frame trolley can be effectively prevented from separation when carrying the front boom section and guiding the front boom section to move in the second direction perpendicular to the first direction in a first plane to a limiting position, thereby avoiding potential safety hazards.

According to another specific embodiment of the present invention, the embodiment of the present invention discloses an extension method for a boom of a dockside container crane. The step of moving the boom extension section to be between the rear boom section and the front boom section and performing mutual alignment includes: moving the boom extension section arranged on the first support frame trolley in the first direction to be between the rear boom section and the front boom section; and moving the boom extension section in a third direction and performing mutual alignment on the boom extension section and the rear boom section in the second direction.

By adoption of the above technical solution, it is ensured that the boom extension section is slightly lower than the rear boom section before the boom extension section is moved, then the height of the boom extension section in the third direction is adjusted by jacks and crossties, which are placed on the second support frame trolley, the boom extension section is docked with the rear boom section firstly based on the rear boom section because the rear boom section is entirely stable and the precision is higher after docking, subsequently, it is also necessary to perform micro-adjustment on the front boom section, and the height of the boom extension section in the third direction is adjusted through the jacks after the boom extension section moves in place in the first direction.

According to another specific embodiment of the present invention, the embodiment of the present invention discloses an extension method for a boom of a dockside container crane. After the step of completing the assembly of the extension trolley tool, the method includes: moving the extension trolley tool to be below the front boom section by moving a bridge crane trolley.

By adoption of the above technical solution, the extension trolley tool is moved to be below the front boom section by moving the bridge crane trolley, and then the extension trolley tool is fixed to be integrated with the boom.

According to another specific embodiment of the present invention, the embodiment of the present invention discloses an extension method for a boom of a dockside container crane. After the step of completing the assembly of the extension trolley tool, the method includes: lifting the first support frame trolley, the second support frame trolley, the process support and the boom extension section to the trolley frame and performing fixation.

By adoption of the above technical solution, the first support frame trolley, the second support frame trolley, the process support and the boom extension section are lifted to the trolley frame by using a truck crane and are fixed, thereby preventing the extension trolley tool from slipping after moving.

According to another specific embodiment of the present invention, the embodiment of the present invention discloses an extension method for a boom of a dockside container crane. After the step of moving the extension trolley tool to be below the front boom section, the method includes: disconnecting the bridge crane trolley and the extension trolley tool.

By adoption of the above technical solution, a connection rod between the bridge crane trolley and the extension trolley tool is removed, the bridge crane trolley runs to a parking space, stops and anchors, and then the steel wire ropes for pulling the trolley are removed.

According to another specific embodiment of the present invention, the embodiment of the present invention discloses an extension method for a boom of a dockside container crane. Before the step of connecting the boom extension section to the rear boom section and the front boom section, the method includes: controlling the docking flatness of a port and welding shrinkage of a splicing seam.

By adoption of the above technical solution, the boom bodies at the two ends and the boom extension section can be further prevented from shrinkage or expansion deformation.

Figure 1:
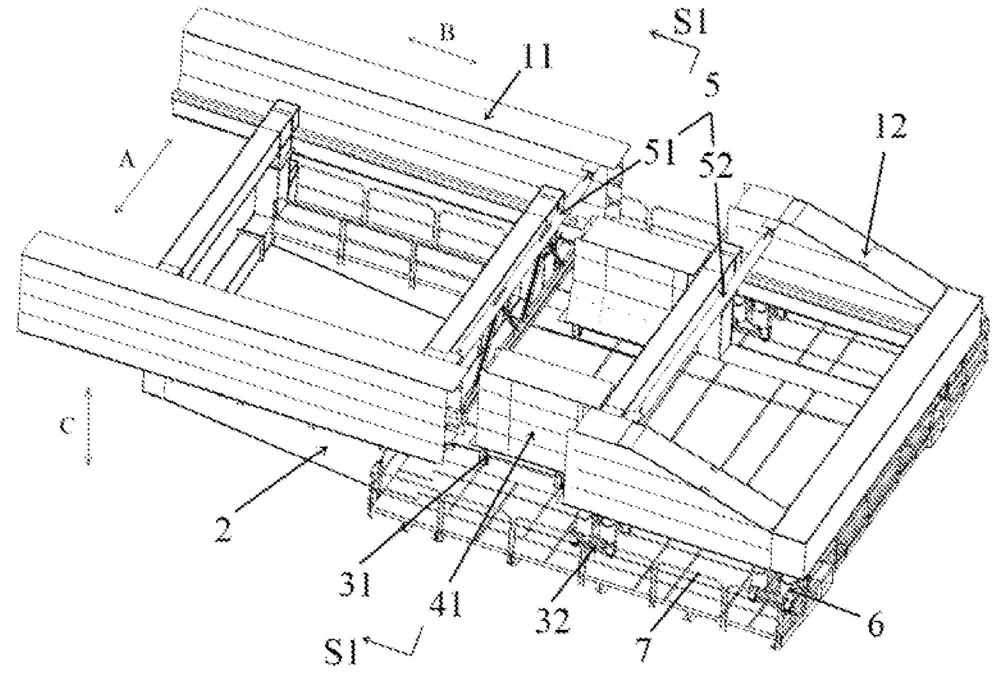
FIG. 1 is a structural schematic diagram of a boom extension device for a dockside container crane according to an embodiment of the present invention.

The above accompanying drawings include the following reference numerals:

11: rear boom section; 12: front boom section;
2: extension trolley tool; 21: wheel set; 22: trolley frame; 23: construction platform;
24: movement track;
31: first support frame trolley; 32: second support frame trolley;
41: boom extension section;
5: process support; 51: first process support; 52: second process support;
6: jack; 7: detachable casing handrail; L: cutting line; 8: stop plate; 9: crosstie; 10: pull lug; 11: chain block;
A: first direction; B: second direction; C: third direction.

DETAILED DESCRIPTION

The implementation manners of the present invention are described below by the specific embodiments. Those skilled in the art may easily understand other advantages and effects of the present invention by the contents disclosed by the specification. Although the description of the present invention will be introduced together with preferred embodiments, it does not mean that the features of the present invention are not limited to the implementation manners. On the contrary, the objective of introducing the present invention with reference to the implementation manner is to cover other options or modifications that may be extended based on the claims of the present invention. To provide the deep understanding of the present invention, many specified details will be included in the following description. The present invention may also be implemented without using these details. In addition, to avoid confusion or obscuring of the focus of the present invention, some specific details will be omitted in the description. It should be noted that the embodiments in the present invention and features in the embodiments may be combined with each other without conflicts.

It should be noted that in the specification, similar reference numerals and letters represent similar items in the accompanying drawings below. Therefore, once an item is defined in one drawing, it does not need to be further defined and described in subsequent drawings.

In the description of the present invention, it should be noted that orientations or position relationships indicated by terms "upper", "lower", "inner", "bottom" and the like are orientation or position relationships shown in the accompanying drawings, or are orientation or position relationships that the product of the present invention is usually placed during use, and these terms are only used to facilitate description of the present invention and simplify the description, but not to indicate or imply that the mentioned apparatus or components must have a specific orientation or must be established and operated in a specific orientation, and thus these terms cannot be understood as a limitation to the present invention.

The terms “first”, “second” and the like are used only for distinguishing the description and cannot be understood as indicating or implying relative importance.

In the description of the embodiments, it should be noted that, unless otherwise specified and limited, the terms “arrange”, “link” and “connect” should be understood in a broad sense, for example, they may be fixed connection, may be detachable connection or integrated connection, may be mechanical connection, may also be electrical connection, may be direction connection, may also be indirect connection through an intermediate medium, and may be communication of two elements. Those of ordinary skill in the art may understand specific meanings of the above-mentioned terms in the embodiments based on the specific situations.

In order to make the objective, technical solutions and advantages of the present invention clearer, the implementation manners of the present invention will be further described in detail in combination with the accompanying drawings.

“First plane” in the present invention refers to a plane where a first direction is perpendicular to a second direction. As shown in FIG. 1, in the present invention, a first plane includes a first direction A and a second direction B, wherein the second direction B may be regarded as an axial direction of a boom, and the first direction A may be regarded as a direction perpendicular to the axial direction of the boom in the first plane.

Figure 2:
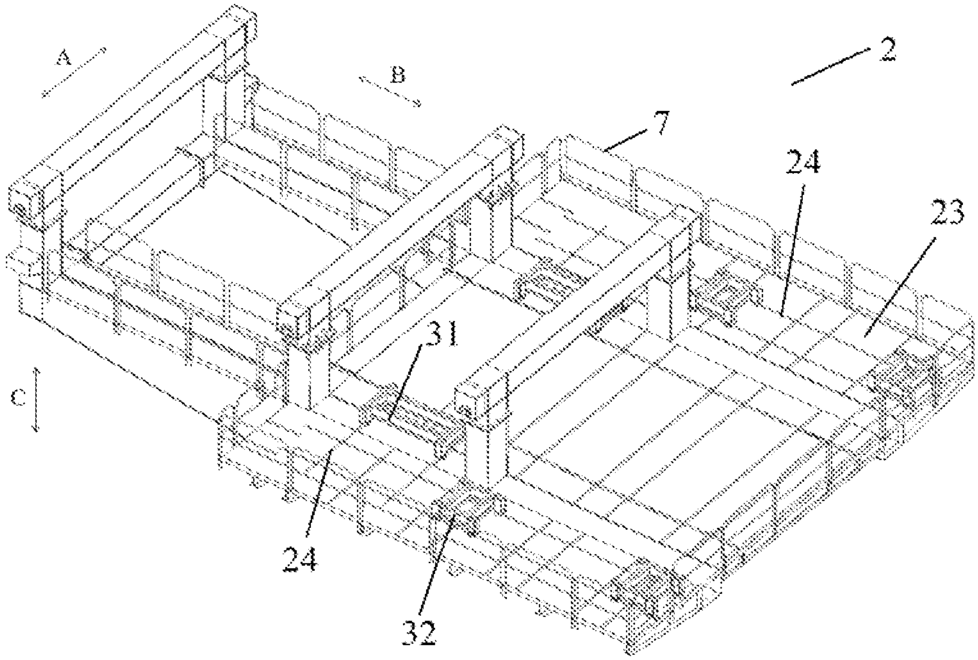
FIG. 2 is a first structural schematic diagram of an extension trolley tool of a boom extension device for a dockside container crane according to an embodiment of the present invention.
Figure 3:
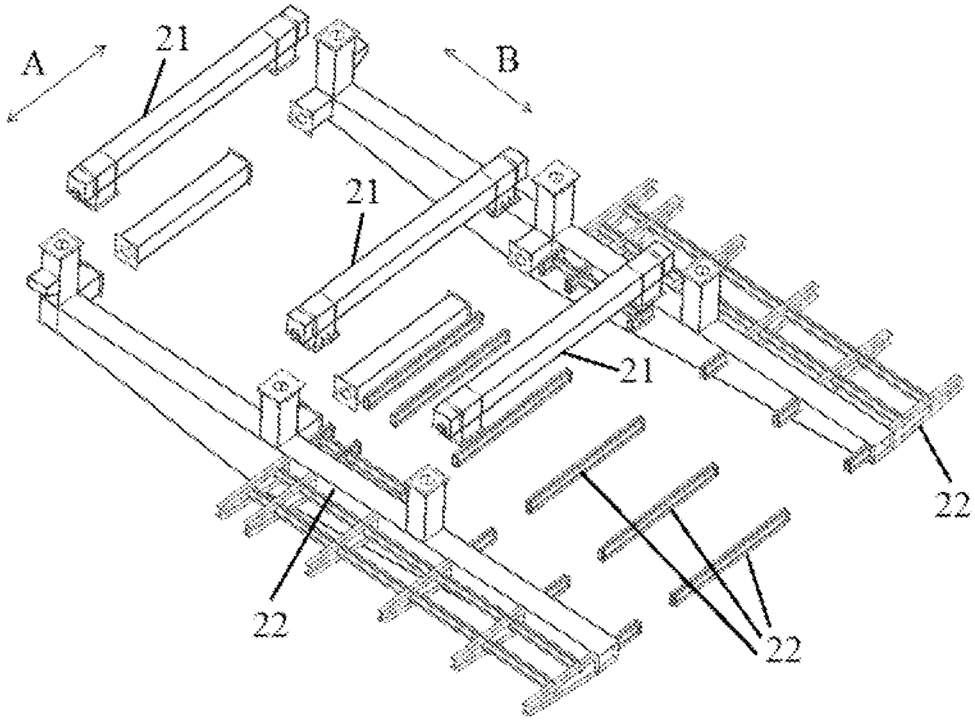
FIG. 3 is a second structural schematic diagram of an extension trolley tool of a boom extension device for a dockside container crane according to an embodiment of the present invention.

A boom extension device for a dockside container crane is described below according to specific embodiments of the present invention and with reference to FIG. 1. FIG. 1 is a structural schematic diagram of a boom extension device for a dockside container crane according to an embodiment of the present invention. FIG. 2 is a first structural schematic diagram of an extension trolley tool of a boom extension device for a dockside container crane according to an embodiment of the present invention. FIG. 3 is a second structural schematic diagram of an extension trolley tool of a boom extension device for a dockside container crane according to an embodiment of the present invention. In the boom extension device for the dockside container crane according to the specific embodiment of the present invention, the boom includes a rear boom section 11 and a front boom section 12. The extension device includes: an extension trolley tool 2, used to be arranged below the rear boom section 11 and the front boom section 12 during extension operation and including a wheel set 21, a trolley frame 22, a construction platform 23, and a movement track 24 arranged on the construction platform 23; a first support frame trolley 31, arranged on the movement track 24 and used to carry a boom extension section 41 and guide the boom extension section 41 to move in a first direction A; and a second support frame trolley 32, arranged on the movement track 24 and used to carry the front boom section 12 and guide the front boom section 12 to move in a second direction B perpendicular to the first direction A in a first plane. Specifically, before extension operation, the extension trolley tool 2 is arranged below the rear boom section 11 and the front boom section 12, the first support frame trolley 31 carries the boom extension device 41 to be arranged on the movement track 24, and the second support frame trolley 32 is arranged on the movement track 24 and is used to carry the front boom section to move in the second direction B perpendicular to the first direction A in the first plane during extension operation. That is, the boom extension device for the dockside container crane provided by the embodiment of the present invention is safe and reliable, and can extend the boom after being mounted in place, it is unnecessary to mount auxiliary equipment, a quay crane does not need to move, and extension operation can be performed on the original operation track, so that the use of large equipment is reduced.

Figure 4:
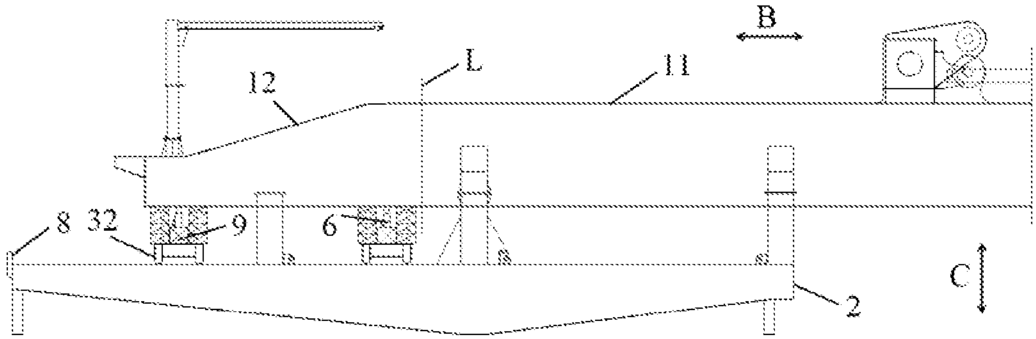
FIG. 4 is a first schematic diagram of extension operation of a boom extension device for a dockside container crane according to an embodiment of the present invention.

FIG. 1 is a structural schematic diagram of a boom extension device for a dockside container crane according to an embodiment of the present invention. FIG. 4 is a first schematic diagram of extension operation of a boom extension device for a dockside container crane according to an embodiment of the present invention. The technical solution of the embodiment is basically the same as the solution in the embodiment 1, except that a process support 5 arranged on two sides of a cutting line L is further included in the embodiment. Specifically, before the boom is cut, the process support 5 is mounted on two sides of the cutting line L, so that boom bodies at two ends, i.e., the front boom section 12 and the rear boom section 11, can be prevented from shrinkage or expansion deformation after the boom is cut.

FIG. 1 is a structural schematic diagram of a boom extension device for a dockside container crane according to an embodiment of the present invention. FIG. 4 is a first schematic diagram of extension operation of a boom extension device for a dockside container crane according to an embodiment of the present invention. The technical solution of the embodiment is basically the same as the solution in the embodiment 1, except that the embodiment further includes that the process support 5 includes a first process support 51 and a second process support 52, wherein two ends of the first process support 51 are connected to two inner side walls of the rear boom section 11, and two ends of the second process support 52 are connected to two inner side walls of the front boom section 12. Specifically, before the boom is cut, the first process support 51 and the second process 52 are mounted on two sides of the cutting line L respectively, two ends of the first process support 51 are connected to inner side walls of the boom, and two ends of the second process support 52 are connected to the inner side walls of the boom. After the boom is cut into the front boom section 12 and the rear boom section 11 along the cutting line, the connection positions of the first process support 51 may be regarded as that the two ends of the first process support 51 are connected to two inner side walls of the rear boom section 11, and the connection positions of the second process support 52 may be regarded as that the two ends of the second process support 52 are connected to two inner side walls of the front boom section 12, so that the cutting port of the front boom section 12 and the rear boom section 11 is prevented from shrinkage and expansion deformation.

Figure 9:
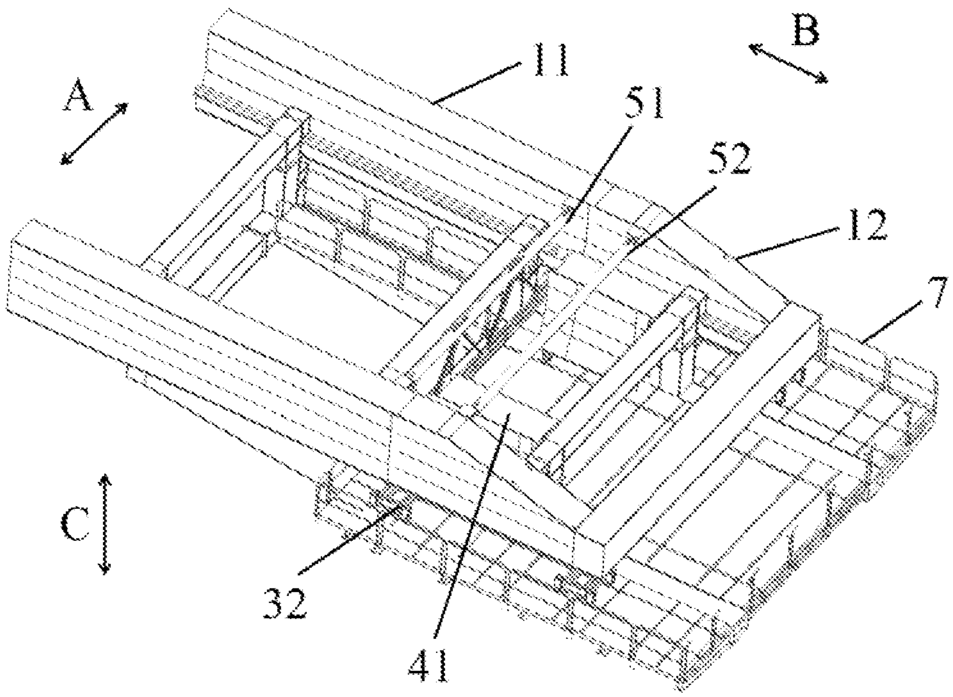
FIG. 9 is a fourth schematic diagram of extension operation of a boom extension device for a dockside container crane according to an embodiment of the present invention.

FIG. 9 is a fourth schematic diagram of extension operation of a boom extension device for a dockside container crane according to an embodiment of the present invention. The technical solution of the embodiment is basically the same as the solution in the embodiment 1, except that a boom extension section 41 arranged below the second process support 52 is further included in the embodiment. Specifically, before extension operation, the boom extension section 41 is arranged below the second process support 52. During extension operation, after the front boom section 12 provided with the second process support 52 moves in place, the boom extension section 41 may directly move in the first direction A and is aligned with the rear boom section 11. The ingenious structural design prevents the boom extension section 41 from being singly lifted from the ground to high altitude, the use of large equipment is further reduced, and the efficiency of the extension operation is improved.

FIG. 1 is a structural schematic diagram of a boom extension device for a dockside container crane according to an embodiment of the present invention. The technical solution of the embodiment is basically the same as the solution in the embodiment 1, except that jacks 6 arranged below the front boom section 12 and the rear boom section 11 are further included in the embodiment. Specifically, the jacks 6 arranged below the front boom section 12 and the rear boom section 11 may adjust the position heights of the front boom section 12 and the rear boom section 11 in a third direction C.

FIG. 1 is a structural schematic diagram of a boom extension device for a dockside container crane according to an embodiment of the present invention. FIG. 3 is a second structural schematic diagram of an extension trolley tool of a boom extension device for a dockside container crane according to an embodiment of the present invention. The technical solution of the embodiment is basically the same as the solution in the embodiment 1, except that an extension trolley tool is further included in the embodiment, wherein the extension trolley tool further includes: detachable casing handrails 7 arranged on casings around the trolley frame 22. Specifically, the detachable casing handrails 7 are provided, thereby facilitating disassembly, assembly and transportation, and further ensuring the safety of workers in the operation process.

FIG. 1 is a structural schematic diagram of a boom extension device for a dockside container crane according to an embodiment of the present invention. FIG. 4 is a first schematic diagram of extension operation of a boom extension device for a dockside container crane according to an embodiment of the present invention. The technical solution of the embodiment is basically the same as the solution in the embodiment 1, except that the embodiment further includes that a distance between the first process support or/and the second process support and the cutting line is 800 mm. Specifically, the distance between the first process support 51 or/and the second process support 52 and the cutting line L is preferably 800 mm, so that the cutting port of the front boom section 12 and the rear boom section 11 can be effectively prevented from shrinkage and expansion deformation.

FIG. 1 is a structural schematic diagram of a boom extension device for a dockside container crane according to an embodiment of the present invention. The technical solution of the embodiment is basically the same as the solution in the embodiment 1, except that the embodiment further includes that the process support is a round pipe, the round pipe has high rigidity and strength, and the round pipe, as the process support, can effectively prevent the front boom section and the rear boom section from shrinkage or expansion deformation. The description of the process support according to the embodiment of the present invention is not limited therewith.

FIG. 1 is a structural schematic diagram of a boom extension device for a dockside container crane according to an embodiment of the present invention. FIG. 4 is a first schematic diagram of extension operation of a boom extension device for a dockside container crane according to an embodiment of the present invention. The technical solution of the embodiment is basically the same as the solution in the embodiment 1, except that a stop plate 8 arranged on a head part of the extension trolley tool 2 is further included in the embodiment, so that the second support frame trolley 32 can be effectively prevented from separation when carrying the font boom section 12 and guiding the front boom section 12 to move in the second direction B perpendicular to the first direction A in the first plane to a limiting position, thereby avoiding potential safety hazards.

FIG. 4 is a first schematic diagram of extension operation of a boom extension device for a dockside container crane according to an embodiment of the present invention. The technical solution of the embodiment is basically the same as the solution in the embodiment 1, except that crossties 9 arranged on the first support frame trolley 31 and the second support frame trolley 32 are further included in the embodiment. As shown in FIG. 4, the crosstie 9 may be arranged between the jack 6 and the second support frame trolley 32, or may be directly arranged between the front boom section 12 and the second support frame trolley 32, and may effectively adjust the position height of the boom extension section 41 in the third direction C. The crosstie 9 on the first support frame trolley 31 may have the same arrangement mode as that on the second support frame trolley 32, or the crossties 9 may be arranged on the first support frame trolley 31 according to FIG. 6, but the present invention is not limited therewith.

Figure 5:
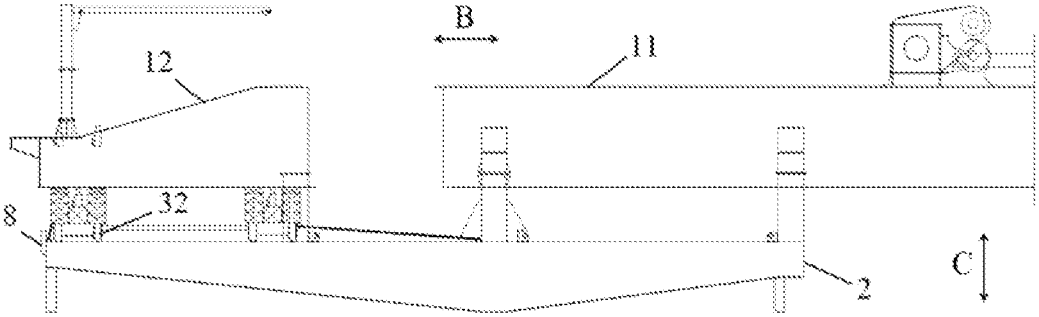
FIG. 5 is a second schematic diagram of extension operation of a boom extension device for a dockside container crane according to an embodiment of the present invention.
Figure 8:
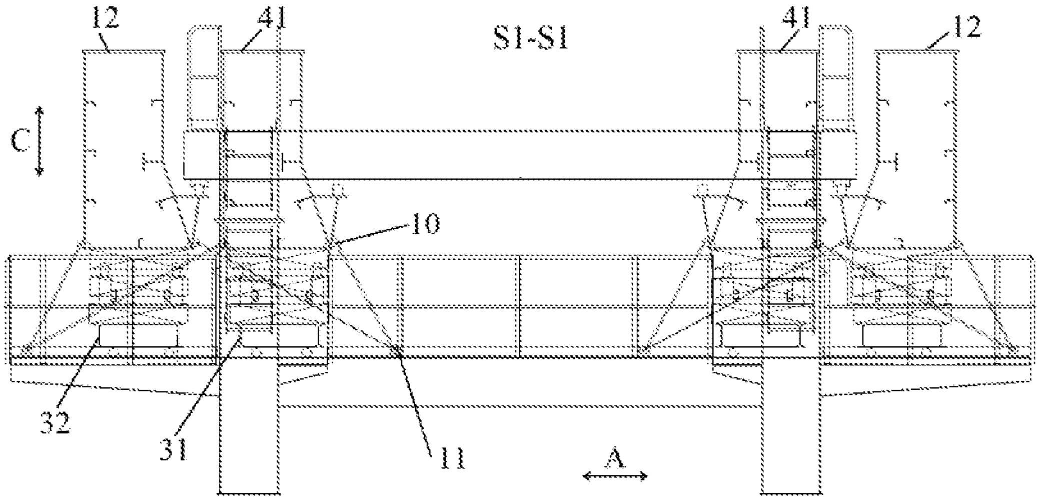
FIG. 8 is a schematic diagram of FIG. 1 in an S1 direction.

FIG. 5 is a second schematic diagram of extension operation of a boom extension device for a dockside container crane according to an embodiment of the present invention. FIG. 8 is a schematic diagram of FIG. 1 in an S1 direction. The technical solution of the embodiment is basically the same as the solution in the embodiment 1, except that the embodiment further includes pull lugs 10 and steel wire ropes which are arranged in the second direction B and are used to move the front boom section 12, and the front boom section 12 is moved by chain blocks 11 and the pull lugs 10 along the second direction B (referring to the second direction B in FIG. 5).

Figure 7:
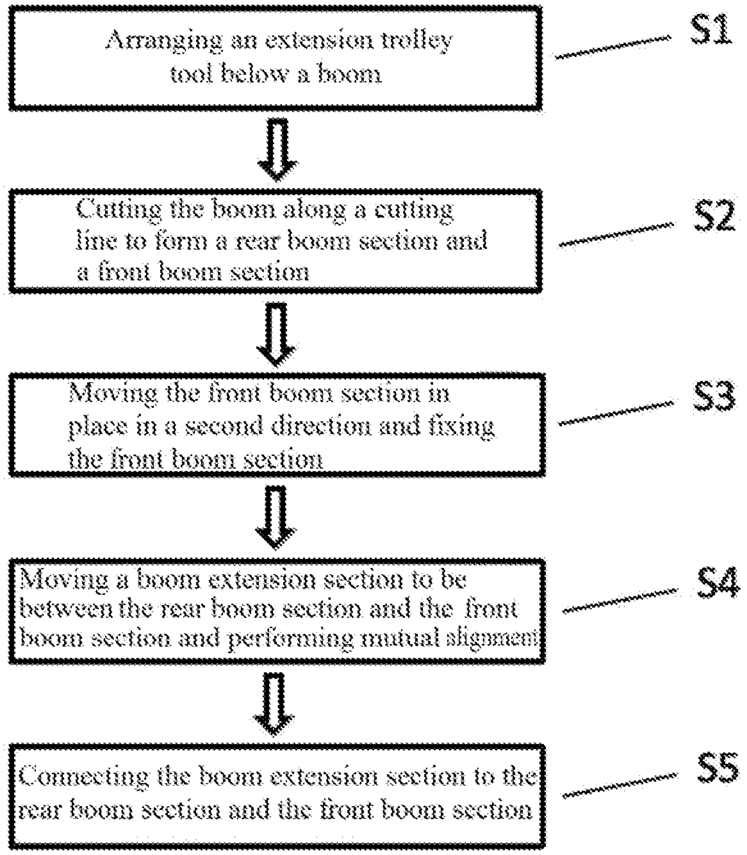
FIG. 7 is a flowchart of an extension method for a boom of a dockside container crane according to an embodiment of the present invention.

An extension method for a boom of a dockside container crane according to a specific embodiment of the present invention is described with reference to FIG. 7 which is a flowchart of an extension method for a boom of a dockside container crane according to an embodiment of the present invention. FIG. 7 is a flowchart of an extension method for a boom of a dockside container crane according to an embodiment of the present invention. The extension device for the boom of the dockside container crane according to the specific embodiment of the present invention includes:

S1: an extension trolley tool is arranged below a boom;

S2: the boom is cut along a cutting line to form a rear boom section and a front boom section;

S3: the front boom section is moved in place in a second direction and is fixed;

S4: a boom extension section is moved to be between the rear boom section and the front boom section and mutual alignment is performed; and S5: the boom extension section is connected to the rear boom section and the front boom section.

Specifically, FIG. 4 is a first schematic diagram of extension operation of a boom extension device for a dockside container crane according to an embodiment of the present invention. Before extension operation, an extension trolley tool 2 is arranged below the boom: during extension operation, the boom is cut along a cutting line L to form a rear boom section 11 and a front boom section 12; according to the requirements of the extension operation, the front boom section 12 is moved in place in a second direction B and is fixed, and the moving distance of the front boom section 12 in the second direction B is slightly greater than the length of a boom extension section 41, thereby facilitating adjustment of the position of the boom extension section 41 and effective implementation of the extension operation; the boom extension section 41 is moved to be between the rear boom section 11 and the front boom section 12 and mutual alignment is performed; and the boom extension section 41 is connected to the rear boom section 11 and the front boom section 12, wherein the connection may be welding. The extension method for the boom of the dockside container crane provided by the embodiment of the present invention is safe and reliable, it is unnecessary to mount auxiliary equipment, a quay crane does not need to move, and the extension operation can be performed on an original operation track, so that the use of large equipment is reduced.

FIG. 2 is a first structural schematic diagram of an extension trolley tool of a boom extension device for a dockside container crane according to an embodiment of the present invention. FIG. 3 is a second structural schematic diagram of an extension trolley tool of a boom extension device for a dockside container crane according to an embodiment of the present invention. The technical solution of the embodiment is basically the same as the solution in the embodiment 2, except that the embodiment further includes that before the step that the extension trolley tool 2 is arranged below the boom, the method includes: a trolley frame 22 of the extension trolley tool 2 is assembled on the ground, and a construction platform 23 is mounted. Specifically, the trolley frame 22 of the extension trolley tool 2 is assembled on the ground and the construction platform 23 is mounted, so that the aloft workload is reduced and higher safety is achieved.

FIG. 2 is a first structural schematic diagram of an extension trolley tool of a boom extension device for a dockside container crane according to an embodiment of the present invention. FIG. 3 is a second structural schematic diagram of an extension trolley tool of a boom extension device for a dockside container crane according to an embodiment of the present invention. The technical solution of the embodiment is basically the same as the solution in the embodiment 2, except that the embodiment further includes that after the step that the trolley frame 22 of the extension trolley tool 2 is assembled on the ground and the construction platform 23 is mounted, the method includes: the trolley frame 22 is lifted to be subjected to areal docking with a wheel set 21 lifted on the boom to complete assembly of the extension trolley tool 2, wherein the extension trolley tool 2 includes the wheel set 21, the trolley frame 22, the construction platform 23, and a movement track 24 arranged on the construction platform 23. Specifically, the wheel set 21 (which may be three wheel sets) is firstly lifted by a truck crane to the boom above the movement track 24, then the trolley frame 22 is lifted by a winch to be subjected to aerial docking with the wheel set 21 on the boom, and flanges on the trolley frame 22 and the wheel set 21 are adjusted by chain blocks until bolts are assembled completely, thereby completing assembly of the extension trolley tool 2. The assembly of the whole extension trolley tool has small aloft workload and higher safety, and the stability of the extension trolley tool is higher.

FIG. 1 is a structural schematic diagram of a boom extension device for a dockside container crane according to an embodiment of the present invention. FIG. 4 is a first schematic diagram of extension operation of a boom extension device for a dockside container crane according to an embodiment of the present invention. The technical solution of the embodiment is basically the same as the solution in the embodiment 2, except that the embodiment further includes that before the step that the boom is cut along the cutting line 1, to form the rear boom section 11 and the front boom section 12, the method includes: a process support 5 is arranged on two sides of the cutting line L in the first direction A. Boom bodies at two ends, i.e., the front boom section 12 and the rear boom section 11, are prevented from shrinkage or expansion deformation after the boom is cut.

The technical solution of the embodiment is basically the same as the solution in the embodiment 2, except that the embodiment further includes that the front boom section 12 is moved in place in the second direction B and is fixed includes: pull lugs and steel wire ropes are arranged in the second direction B for moving the front boom section 12 arranged on a second support frame trolley 32. Specifically, the pull lugs and the steel wire ropes are arranged in the second direction B for moving the front boom section 12, and the front boom section 12 is moved by the chain blocks and the pull lugs in the second direction B.

The technical solution of the embodiment is basically the same as the solution in the embodiment 2, except that the embodiment further includes that the step that the front boom section 12 is moved in place in the second direction B and is fixed includes: after the front boom section 12 is in place, the chain blocks and wheels of the second support frame trolley 32 are locked, thereby avoiding potential safety hazards caused by the sliding of the front boom section 12.

FIG. 5 is a second schematic diagram of extension operation of a boom extension device for a dockside container crane according to an embodiment of the present invention. The technical solution of the embodiment is basically the same as the solution in the embodiment 2, except that the embodiment further includes that the step that the front boom section 12 is moved in place in the second direction B and is fixed includes: a stop plate 8 is arranged on a head part of the extension trolley tool 2 to prevent the second support frame trolley 32 from separation after arriving at a limiting position.

Figure 6:
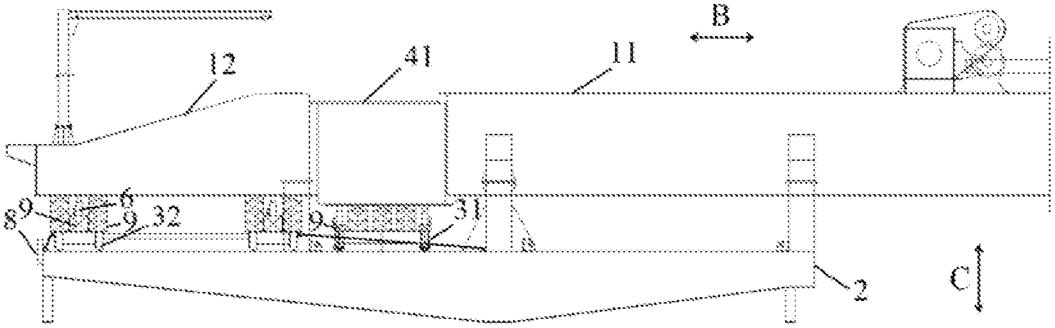
FIG. 6 is a third schematic diagram of extension operation of a boom extension device for a dockside container crane according to an embodiment of the present invention.

FIG. 6 is a third schematic diagram of extension operation of a boom extension device for a dockside container crane according to an embodiment of the present invention. The technical solution of the embodiment is basically the same as the solution in the embodiment 2, except that the embodiment further includes that the step that the boom extension section 41 is moved to be between the rear boom section 11 and the front boom section 12 and mutual alignment is performed includes: the boom extension section 41 arranged on a first support frame trolley 31 is moved to be between the rear boom section 11 and the front boom section 12 in the first direction A: and the boom extension section 41 is moved in a third direction C, and mutual alignment is performed on the boom extension section 41 and the rear boom section 11 in the second direction B. Specifically, it is ensured that the boom extension section 41 is slightly lower than the rear boom section before the boom extension section 41 is moved, then the height of the boom extension section 41 in the third direction C is adjusted by jacks 6 and crossties which are placed on the second support frame trolley 32, the boom extension section 41 is docked with the rear boom section 11 firstly based on the rear boom section 11 because the rear boom section 11 is entirely stable and the precision is higher after docking, subsequently, it is also necessary to perform micro-adjustment on the front boom section 12 subsequently, and the height of the boom extension section 41 in the third direction C is adjusted through the jacks 6 after the boom extension section 41 moves in place in the first direction.

The technical solution of the embodiment is basically the same as the solution in the embodiment 2, except that the embodiment further includes that after the step that assembly of the extension trolley tool 2 is completed, the method includes: the extension trolley tool 2 is moved to be below the front boom section 12 by moving a bridge crane trolley, and then the extension trolley tool 2 is fixed to be integrated with the boom.

The technical solution of the embodiment is basically the same as the solution in the embodiment 2, except that that embodiment further includes that after the step that assembly of the extension trolley tool 2 is completed, the method includes: the first support frame trolley 31, the second support frame trolley 32, the process support 5 and the boom extension section 41 are lifted to the trolley frame 22 and are fixed. Specifically, the first support frame trolley 31, the second support frame trolley 32, the process support 5 and the boom extension section 41 are lifted to the trolley frame 22 by a truck crane and are fixed, thereby preventing the extension trolley tool from slipping after moving.

The technical solution of the embodiment is basically the same as the solution in the embodiment 2, except that the embodiment further includes that after the step that the extension trolley tool 2 is moved to be below the front boom section 12, the method includes: the bridge crane trolley and the extension trolley tool 2 are disconnected. Specifically, a connection rod between the bridge crane trolley and the extension trolley tool is removed, the bridge crane trolley runs to a parking space, stops and anchors, and then the steel wire ropes for pulling the trolley are removed.

The technical solution of the embodiment is basically the same as the solution in the embodiment 2, except that the embodiment further includes that before the step that the boom extension section 41 is connected to the rear boom section 11 and the front boom section 12, the method includes: the docking flatness of a port and welding shrinkage of a splicing seam are controlled. Specifically, before the boom extension section 41 is connected to the rear boom section 11 and the front boom section 12, wherein the connection may be welding, the port splicing position is fixed through a fixture, so that the docking flatness of the port and welding shrinkage of the splicing seam are controlled. After the worker confirms that the docking size is correct, spot welding is performed to complete the docking of the boom extension section and the rear boom section; then the docking of the front boom section and the boom extension section is completed according to the above step, and welding starts to be performed after all the spot welding work is completed, after welding, the quality of the welding seam is checked, and subsequent work such as polishing and painting is performed; a tool piece is disassembled, and connection of the steel wire ropes and the accessories is restored; and functions, mainly referring to speed-reducing limitation on the boom, displacement of parking limitation space, extension of an anti-collision system, or the like, required by extension operation, are subjected to restoration or extended restoration.

The present invention may include combinations of various specific embodiments described below.

According to a boom extension device for a dockside container crane provided by an example 1 of the present invention, a boom includes a rear boom section and a front boom section. The boom extension device includes: an extension trolley tool, used to be arranged below the rear boom section and the front boom section during extension operation and including a wheel set, a trolley frame, a construction platform, and a movement track arranged on the construction platform; a first support frame trolley, used to carry a boom extension section and guide the boom extension section to move in a first direction; and a second support frame trolley, arranged on the movement track and used to carry the front boom section and guide the front boom section to move in a second direction perpendicular to the first direction in a first plane.

According to a boom extension device for a dockside container crane provided by an example 2 of the present invention, the boom extension device includes: a process support arranged on two sides of a cutting line.

According to a boom extension device for a dockside container crane provided by an example 3 of the present invention, the process support includes a first process support and a second process support, wherein two ends of the first process support are connected to two inner side walls of the rear boom section, and two ends of the second process support are connected to two inner side walls of the front boom section.

According to a boom extension device for a dockside container crane provided by an example 4 of the present invention, the boom extension section is arranged below the second process support.

According to a boom extension device for a dockside container crane provided by an example 5 of the present invention, the boom extension device further includes: jacks arranged below the front boom section and the boom extension section.

According to a boom extension device for a dockside container crane provided by an example 6 of the present invention, the extension tool trolley further includes: detachable casing handrails arranged on casings around the trolley frame.

According to a boom extension device for a dockside container crane provided by an example 7 of the present invention, a distance between the first process support or/and the second process support and the cutting line is 800 mm.

According to a boom extension device for a dockside container crane provided by an example 8 of the present invention, the process support is a round pipe.

According to a boom extension device for a dockside container crane provided by an example 9 of the present invention, the boom extension device further includes a stop plate arranged on a head part of the extension trolley tool.

According to a boom extension device for a dockside container crane provided by an example 10 of the present invention, the boom extension device further includes crossties arranged on the first support frame trolley and the second support frame trolley.

According to a boom extension device for a dockside container crane provided by an example 11 of the present invention, the boom extension device further includes pull lugs and steel wire ropes which are arranged in the second direction and are used to move the front boom section.

According to an extension method for a boom of a dockside container crane provided by an example 12 of the present invention, the method includes the following steps: an extension trolley tool is arranged between a boom; the boom is cut along a cutting line to form a rear boom section and a front boom section; the front boom section is moved in place in a second direction and is fixed; a boom extension section is moved to be between the rear boom section and the front boom section and mutual alignment is performed; and the boom extension section is connected to the rear boom section and the front boom section.

According to an extension method for a boom of a dockside container crane provided by an example 13 of the present invention, before the step that the extension trolley tool is arranged below the boom, the method includes: a trolley frame of the extension trolley tool is assembled on the ground and a construction platform is mounted.

According to an extension method for a boom of a dockside container crane provided by an example 14 of the present invention, after the step that the trolley frame of the extension trolley tool is assembled on the ground and the construction platform is mounted, the method includes: the trolley frame is lifted to be subjected to aerial docking with a wheel set lifted on the boom to complete assembly of the extension trolley tool, wherein the extension trolley tool includes the wheel set, the trolley frame, the construction platform, and the movement track on the construction platform.

According to an extension method for a boom of a dockside container crane provided by an example 15 of the present invention, before the step that the boom is cut along the cutting line to form the rear boom section and the front boom section, the method includes: the process support is arranged on two sides of the cutting line in the first direction.

According to an extension method for a boom of a dockside container crane provided by an example 16 of the present invention, the step that the front boom section is moved in place in the second direction and is fixed includes: pull lugs and steel wire ropes are arranged in the second direction for moving the front boom section arranged on the second support frame trolley.

According to an extension method for a boom of a dockside container crane provided by an example 17 of the present invention, the step that the front boom section is moved in place along the second direction and is fixed includes: after the front boom section is in place, chain blocks and wheels of the second support frame trolley are locked.

According to an extension method for a boom of a dockside container crane provided by an example 18 of the present invention, the step that the front boom section is moved in place in the second direction and is fixed includes: a stop plate is arranged on a head part of the extension trolley tool, thereby preventing the second support frame trolley from separation after arriving at a limiting position.

According to an extension method for a boom of a dockside container crane provided by an example 19 of the present invention, the step that the boom extension section is moved to be between the rear boom section and the front boom section and mutual alignment is performed includes: the boom extension section arranged on the first support frame trolley is moved to be between the rear boom section and the front boom section in the first direction; and the boom extension section is moved in a third direction, and is subjected to mutual alignment with the rear boom section in the second direction.

According to an extension method for a boom of a dockside container crane provided by an example 20 of the present invention, after the step that assembly of the extension trolley tool is completed, the method includes: the extension trolley tool is moved to be below the front boom section by moving a bridge crane trolley.

According to an extension method for a boom of a dockside container crane provided by an example 21 of the present invention, after the step that assembly of the extension trolley tool is completed, the method includes: the first support frame trolley, the second support frame trolley, the process support and the boom extension section are lifted to the trolley frame and are fixed.

According to an extension method for a boom of a dockside container crane provided by an example 22 of the present invention, after the step that the extension trolley tool is moved to be below the front boom section, the method includes: the bridge crane trolley and the extension trolley tool are disconnected.

According to an extension method for a boom of a dockside container crane provided by an example 23 of the present invention, before the step that the boom extension section is connected to the rear boom section and the front boom section, the method includes: the docking flatness of a port and welding shrinkage of a splicing seam are controlled.

Although the present invention has been illustrated and described with reference to some preferred embodiments of the present invention, those of ordinary skill in the art should understand that the foregoing contents are further detailed illustrations of the present invention in combination with the specific preferred embodiments, and it is not to be determined that the specific embodiments of the present invention are limited to these illustrations. Those skilled in the art may make various changes on forms and details, including several simple deductions or substitutions, without departing from the spirit and scope of the present invention.

What is claimed is:

1. A boom extension device for a dockside container crane, a boom comprising a rear boom section and a front boom section; characterized by comprising:

an extension trolley tool, used to be arranged below the rear boom section and the front boom section during extension operation and comprising a wheel set, a trolley frame, a construction platform, and a movement track arranged on the construction platform;

a first support frame trolley, arranged on the movement track and used to carry a boom extension section and guide the boom extension section to move in a first direction; and a second support frame trolley, arranged on the movement track and used to carry the front boom section and guide the front boom section to move in a second direction perpendicular to the first direction in a first plane.

2. The boom extension device for the dockside container crane according to claim 1, characterized by comprising: a process support, mounted on two sides of a cutting line.

3. The boom extension device for the dockside container crane according to claim 2, characterized in that the process support comprises a first process support and a second process support, wherein two ends of the first process support are connected to two inner side walls of the rear boom section, and two ends of the second process support are connected to two inner side walls of the front boom section.

4. The boom extension device for the dockside container crane according to claim 3, characterized in that the boom extension section is arranged below the second process support.

5. The boom extension device for the dockside container crane according to claim 3, characterized in that a distance between the first process support and/or the second process support and the cutting line is 800 mm.

6. The boom extension device for the dockside container crane according to claim 3, characterized in that each of the first and second process supports is a round pipe.

7. The boom extension device for the dockside container crane according to claim 1, characterized by further comprising: jacks, arranged below the front boom section and the boom extension section.

8. The boom extension device for the dockside container crane according to claim 7, characterized by further comprising crossties, arranged on the first support frame trolley and the second support frame trolley.

9. The boom extension device for the dockside container crane according to claim 1, characterized in that the extension trolley tool further comprises: a detachable casing handrail, arranged on a casing around the trolley frame.

10. The boom extension device for the dockside container crane according to claim 1, characterized by further comprising a stop plate, arranged on a head part of the extension trolley tool.

11. The boom extension device for the dockside container crane according to claim 1, characterized by further comprising a pull lug and a steel wire rope which are arranged in the second direction and are used to move the front boom section.

12. An extension method for a boom of a dockside container crane, characterized by comprising:

arranging an extension trolley tool below said boom;

cutting the boom along a cutting line to form a rear boom section and a front boom section;

moving the front boom section in place along a movement track in a second direction and fixing the front boom section;

moving a boom extension section to be between the rear boom section and the front boom section and performing mutual alignment, wherein the step of moving the boom extension section comprises moving the boom extension section along the movement track in a first direction, the second direction being perpendicular to the first direction in a first plane; and connecting the boom extension section to the rear boom section and the front boom section.

13. The extension method for the boom of the dockside container crane according to claim 12, characterized by further comprising: assembling a trolley frame of the extension trolley tool on the ground, and mounting a construction platform before the step of arranging the extension trolley tool below the boom.

14. The extension method for the boom of the dockside container crane according to claim 13, characterized by comprising: lifting the trolley frame, and performing aerial docking on the trolley frame and a wheel set lifted on the boom to complete assembly of the extension trolley tool, wherein the extension trolley tool comprises the wheel set, the trolley frame, the construction platform, and a movement track arranged on the construction platform after the step of assembling the trolley frame of the extension trolley tool on the ground, and mounting the construction platform.

15. The extension method for the boom of the dockside container crane according to claim 14, characterized by comprising: arranging a process support on two sides of the cutting line in a first direction before the step of cutting the boom along the cutting line to form the rear boom section and the front boom section.

16. The extension method for the boom of the dockside container crane according to claim 15, wherein the step of moving the front boom section in place in the second direction and fixing the front boom section comprises: arranging a pull lug and a steel wire rope in the second direction for moving the front boom section arranged on a second support frame trolley.

17. The extension method for the boom of the dockside container crane according to claim 16, characterized in that the step of moving the front boom section in place in the second direction and fixing the front boom section comprises: after the front boom section is in place, locking chain blocks and wheels of the second support frame trolley.

18. The extension method for the boom of the dockside container crane according to claim 17, characterized in that the step of moving the front boom section in place in the second direction and fixing the front boom section comprises: arranging a stop plate on a head part of the extension trolley tool to prevent the second support frame trolley from separation after arriving at a limiting position.

19. The extension method for the boom of the dockside container crane according to claim 18, characterized in that the step of moving the boom extension section to be between the rear boom section and the front boom section and performing mutual alignment comprises:

moving the boom extension section arranged on the first support frame trolley in a first direction to be between the rear boom section and the front boom section; and moving the boom extension section in a third direction and performing mutual alignment on the boom extension section and the rear boom section in the second direction.

20. The extension method for the boom of the dockside container crane according to claim 19, characterized by comprising: moving the extension trolley tool to be below the front boom section by moving a bridge crane trolley after the step of completing assembly of the extension trolley tool.

21. The extension method for the boom of the dockside container crane according to claim 20, characterized by comprising: lifting the first support frame trolley, the second support frame trolley, the process support and the boom extension section to the trolley frame and performing fixation after the step of completing assembly of the extension trolley tool.

22. The extension method for the boom of the dockside container crane according to claim 20, characterized by comprising: disconnecting the bridge crane trolley and the extension trolley tool after the step of moving the extension trolley tool to be below the front boom section.

23. The extension method for the boom of the dockside container crane according to claim 12, characterized by comprising: controlling the docking flatness of a port and welding shrinkage of a splicing seam before the step of connecting the boom extension section to the rear boom section and the front boom section.

* * * * *